United States Patent [19]

Puntoni

[11] Patent Number: 5,103,918
[45] Date of Patent: Apr. 14, 1992

[54] TILLAGE UNIT

[76] Inventor: Patrick G. Puntoni, R.R.1, Box 217, Pawnee, Ill. 62558

[21] Appl. No.: 584,723

[22] Filed: Sep. 18, 1990

[51] Int. Cl.$^5$ .................................... A01B 13/10
[52] U.S. Cl. .................................. 172/699; 172/724; 172/739; 172/773
[58] Field of Search ............... 172/720, 722, 724, 726, 172/730, 732, 739, 773, 699, 700

[56] References Cited

U.S. PATENT DOCUMENTS

| | | | |
|---|---|---|---|
| 336,160 | 2/1886 | Ritch et al. | 172/730 |
| 620,421 | 2/1899 | Cox | 172/19 |
| 1,032,291 | 7/1912 | McCollum | 172/722 |
| 1,085,359 | 1/1914 | Roosevelt | 172/720 |
| 1,422,418 | 7/1922 | Colby | 172/699 |
| 1,569,271 | 1/1926 | Ewasen | 172/722 |
| 2,190,347 | 3/1939 | Austin | 172/292 |
| 2,266,818 | 12/1941 | Seaholm | 172/722 |
| 2,337,777 | 12/1943 | Seaholm | 172/722 |
| 2,563,177 | 8/1951 | Lilley et al. | 171/83 |
| 2,688,910 | 9/1954 | Adair | 111/101 |
| 2,692,544 | 10/1954 | Jessup | 172/483 |
| 3,171,500 | 3/1965 | Dils, Jr. | 172/722 X |
| 3,254,726 | 6/1966 | Ratkowski | 172/700 |
| 3,923,104 | 12/1975 | Tibbs | 172/730 |
| 4,079,789 | 3/1978 | Byrd et al. | 172/739 X |
| 4,726,428 | 2/1988 | Puntoni | 172/177 |
| 4,825,782 | 5/1989 | Mikkelsen | 111/123 |
| 4,834,189 | 5/1989 | Peterson et al. | 172/722 X |

FOREIGN PATENT DOCUMENTS

| | | | |
|---|---|---|---|
| 952573 | 3/1955 | Fed. Rep. of Germany | 172/700 |
| 584250 | 11/1924 | France | 172/720 |
| 372957 | 8/1973 | U.S.S.R. | 172/730 |
| 1001876 | 3/1983 | U.S.S.R. | 172/722 |

OTHER PUBLICATIONS

"Shaver" Sales Brochure, Shaver Mfg. Co., Jan. 1986.
"Hoe-Boe" Sales Brochure, Lee Blacksmith, Inc., Oct.-1981.

Primary Examiner—Randolph A. Reese
Assistant Examiner—Jeffrey L. Thompson

[57] ABSTRACT

A tillage unit 1 reducing soil surface and soil surface crop residue disturbance is provded, including a thin vertical support shank 13 with a generally V-shaped horizontal blade support assembly 2 mounted to its lowest forward-shaped tip by bolts 8. The blade support assembly 2 is fabricated from the blade backup support 3, primary reinforcing plates 4, secondary reinforcing plates 5, main vertical mounts 6, and load block 7 attached together to form a generally V-shaped inclined structure with the front marginal apex portion forward and lowermost and the widest rear marginal portion opposite the apex and uppermost. The tillage unit's lower bottom-most edges are shaped and positioned to allow incresing clearance proceeding from front to back between the tillage unit 1 and the uncut soil below to allow for adjustment of the operating incline of the soil-contacting blade surface attached to the face of the blade support assembly 2 where the tillage unit 1 is fastened to the carrier frame 18. The V-shaped blade support assembly 2 has the primary blades 11, the secondary blade 12, and rip tooth 10 attached to its forward soil-contacting side by bolts 14, providing a protective, replaceable wear surface. The primary blade 12 and rip tooth 10 overlap the lowest forwardmost leading edges of the blade support assembly 2, forming a slightly larger V-shaped structure with the forward lowest tip of rip tooth 10 at the apex of the V-shape and the forward leading edges of the primary blades 11 raising vertically upward as they incline outward away from the center to their rear outside marginal edges forming at that point the widest horizontal cutting area of the V-shaped portion of the tillage unit 1.

3 Claims, 2 Drawing Sheets

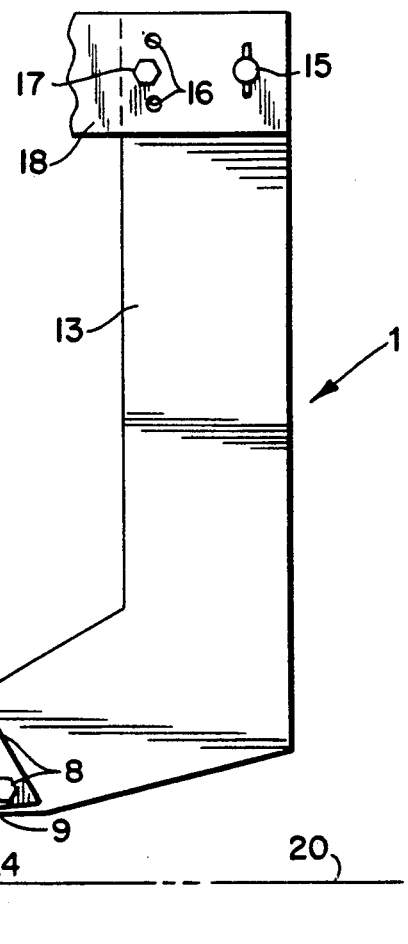
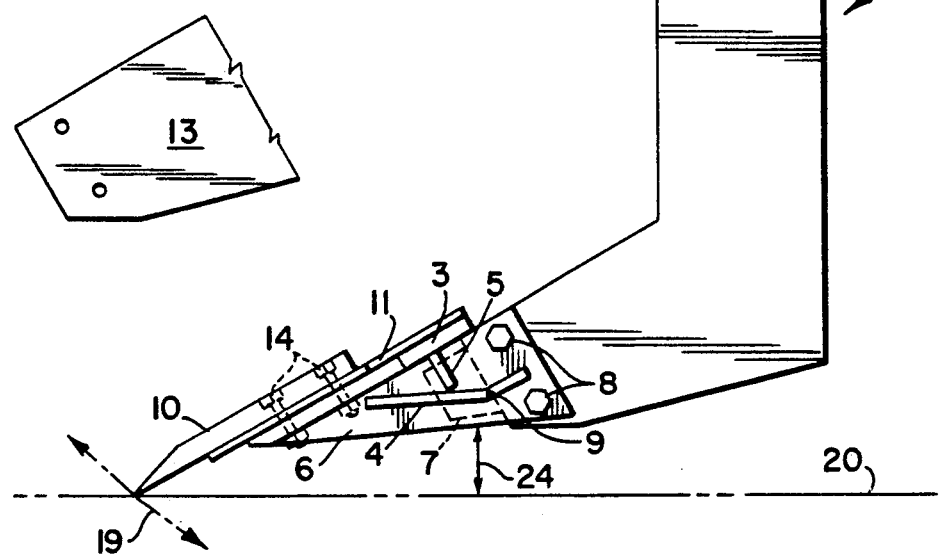
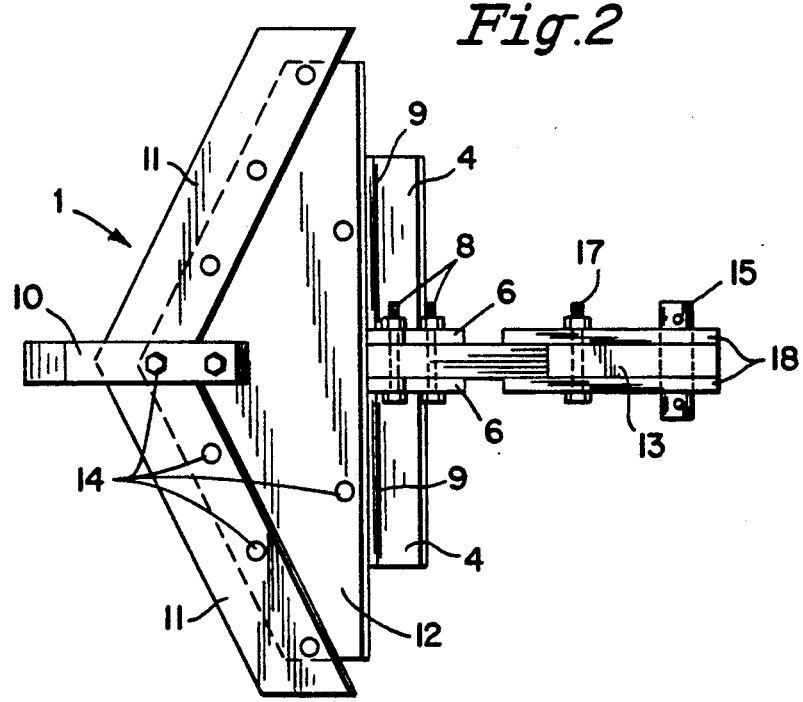

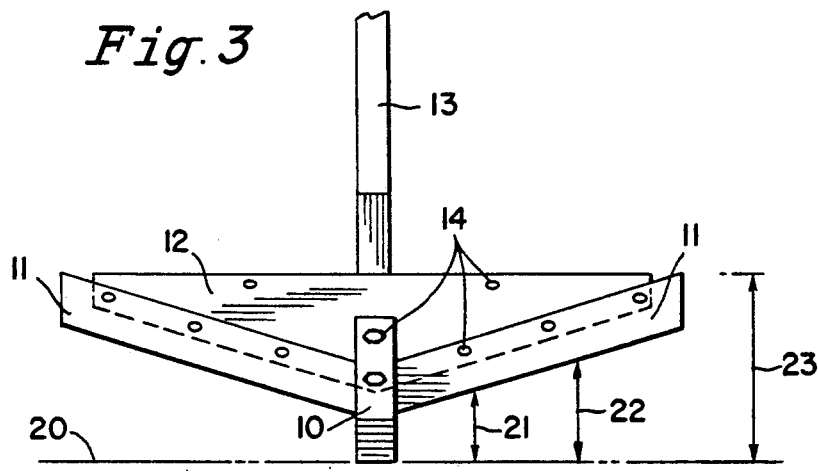
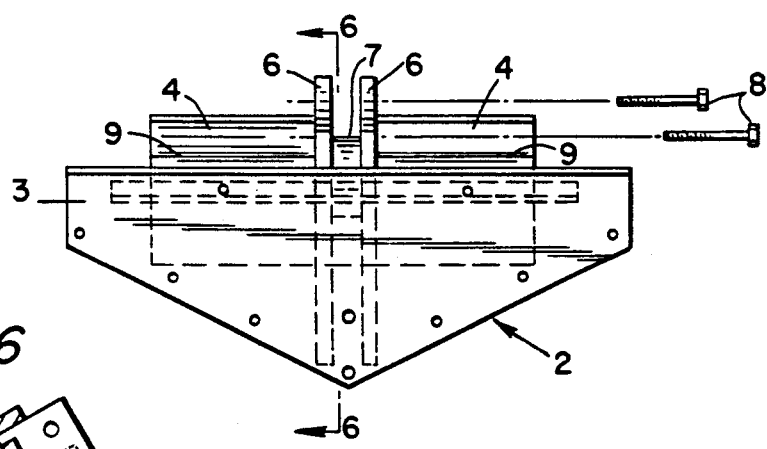
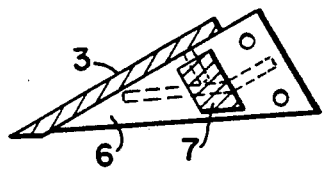
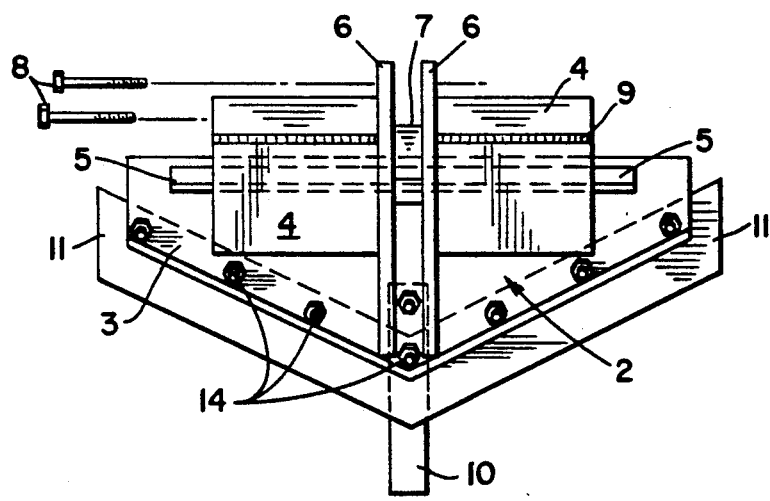

TILLAGE UNIT

BACKGROUND

1. Field of the Invention

This invention relates to a tillage unit whose purpose is to till the entire soil profile within the unit's operating range with minimal soil surface and crop residue disturbance.

2. Relation to Previous Patent

The tillage unit of instant invention is a further improvement of my previous patent U.S. Pat. No. 4,726,428 with substantial structural and operational improvements without substantially changing the soil-working results. Compared to my previous patent, this invention requires considerably less parts, thus reducing both cost and manufacturing time. Also, this machine design is more compact, has greater strength, allows considerably more operating adjustments, and allows greater flexibility in mounting configurations.

3. Description of Related Art

Different forms of tillage units incorporating some of the general structural and operational features of the instant invention are disclosed in U.S. Pat. Nos. 336,160; 620,421; 1,085,359; 1,422,418; 2,190,347; 2,563,177; 2,688,910; 2 692,544; 3,923,104; and 4,825,782. However, these previous known forms of implements to not include the overall combination of structural features of the instant invention, which co-acts to perform the desired tillage operation in an improved manner.

SUMMARY OF THE INVENTION

The tillage unit of the instant invention utilizes a substantially fewer number of shanks with relatively wide blades attached that operate below the surface, tilling large areas of soil adjacent to and between the shanks, thereby reducing both soil surface disturbance and soil surface crop residue disturbance. Further, because of the considerably smaller number of shanks the tillage unit is able to displace more soil while using a reduced amount of horsepower. Further, this tillage unit is constructed to provide the strength to handle considerable operating loads while maintaining a considerably compact design, which allows the tillage unit a range of operating adjustments Further, the tillage unit of instant invention may be readily accommodated on a tractor three-point lift hitch and incorporates operating components which may be readily maintained and/or replaced due to wear. Also, the tillage unit of instant invention can be manufactured in different sizes to accommodated many different mounting arrangements, tractor sizes, and tillage operations. The tillage units can be mounted singly or in gang configuration, depending on the frame arrangement or operating width desired. The tillage unit can also be used in combination (either on the same frame or with a separate operation) with existing tillage equipment if additional soil disturbance or residue incorporation is necessary or desired. Furthermore, the tillage unit includes ground ripping and cutting features which operate independently of a plow sole. The tillage unit, on the contrary, tills the soil in a multi-depth fashion to prevent a plow sole.

The main object of this invention is to provide a tillage unit which is capable of tilling considerably large areas of soil using considerably less components with minimum soil surface and soil surface crop residue disturbance. Another object of this invention is to provide a tillage unit requiring a minimum amount of horsepower to accomplish the desired soil tilling operation. Still another important object of this invention is to provide a tillage unit constructed in such a manner as to perform the desired tillage operation under varying soil conditions. Yet another object of this invention is to provide a tillage unit upon which maintenance and repair operations may be readily performed. Still another important object of this invention is to provide a tillage unit in accordance with the preceding objects and which may be constructed in various sizes and mounted singly or in gang configuration. Another important object of this invention is to provide an agricultural tillage unit which includes adjustment features that enable the tillage unit to be adjusted to perform the tillage operation in various soils and soil operating conditions. Still another object of this invention is to provide an agricultural tillage unit that has adequate ground depth penetration and which is capable of performing the desired tillage operation in a multi-depth fashion to prevent a plow sole. Another important object of this invention is to provide a tillage unit with a compact design capable of accommodating various working widths yet able to withstand the heavy loads encountered with sub-surface tillage. A final object of this invention, to be specifically enumerated herein, is to provide an agricultural tillage unit in accordance with the preceding objects and which will conform to conventional forms of manufacture, be of simple construction, and easy to use so as to provide a device that will be economically feasible, long-lasting, and relatively trouble-free in operation. These, together with other objects and advantages which will become subsequently apparent, reside in the details of construction and operation as more fully hereinafter described and claimed, reference being made to the accompanying drawings forming a part hereof, wherein like numerals refer to like parts throughout.

BRIEF DESCRIPTION OF DRAWINGS

FIG. #1 Is a side plan view of the tillage unit of the instant invention.

FIG. #2 Is a top plan view of the tillage unit of the instant invention.

FIG. #3 Is a fragmentary front view of a lower portion of the tillage unit illustrating the ground cutting method.

FIG. #4 Is a fragmentary top view of the blade support assembly with the primary blades, secondary blade, rip tooth, and support shank removed.

FIG. #5 Is a fragmentary bottom view of the blade support assembly with the primary blades, secondary blade, and rip tooth included but the support shank removed.

FIG. #6 Is a vertical section view of the blade support assembly indicated by the section line 6—6 of FIG. #4.

FIG. #7 Is a fragmentary side view of the lower forward tip of the support shank.

DESCRIPTION OF THE PREFERRED EMBODIMENT

Referring now more specifically to the drawings, the numeral 1 designates the tillage unit of the instant invention. The tillage unit 1 includes a carrier frame referred to by the reference numeral 18. The carrier frame 18 may be a single unit mounted directly to the tractor, or may be the main frame for a plurality of tillage units arranged in gang fashion, such a main frame being provided with support wheels (not shown) of the vertically adjustable type. The carrier frame 18 and the method shown for attaching and adjusting the tillage unit 1 to the carrier frame 18 by means of pivot pin 15, adjustment bolt 17, and adjustment holes in carrier frame 16 is for descriptive purposes only to help describe the function and features of the instant invention (see FIGS. 1 and 2). There are many applicable methods for mounting and providing for adjustment of the tillage unit 1 in single or gang configuration to a carrier frame and still be within the scope of the instant invention. The tillage unit 1 includes a vertical support shank 13 that has a blade support assembly 2 attached to its lower forward tip by means of bolts 8 (see FIGS. 1, 2, and 3). The blade support assembly 2 provides a means to mount the primary blades 11, the secondary blade 12, and the rip tooth 10 in a generally V-shaped pattern that will penetrate, cut, lift, and break loose the soil profile within its operating range (see FIGS. 2, 3, and 5).

The support shank 13 is made from relatively thin metal plate of sufficient strength to handle the operating loads acting on the blade support assembly 2 and provide adequate clearance between the carrier frame 18 and the blade support assembly 2, allowing the free flow of worked soil and crop residue without obstruction while the tillage unit 1 is operating at its greater depths (see FIG. 1). The support shank 13 is shaped at its lower forward tip to match the corresponding mating surface of the load block 7 when the blade support assembly 2 is attached and held in place by means of bolts 8 (see FIGS. 1, 6, and 7). This method of and the blade support assembly 2 allowing the greatest proportion of operating load acting on the blade support assembly 2 to be carried by the mating surfaces between the support shank 13 and the load block 7, and reducing the load on bolts 8 (see FIGS. 6 and 7). The blade support assembly 2 is made from a number of individual parts attached together to form a generally V-shaped structure capable of handling the high operating and shock loads it will experience, yet be compact enough in size to reduce power consumption and improve soil flow, and allow for a range of operating adjustments to improve performance in various soils and operating conditions. A single blade support assembly 2 is fabricated in this case from one blade backup support 3, two primary reinforcing plates 4, two secondary reinforcing plates 5, two main vertical mounts 6, and one load block 7, all fastened (in this case welded) together to form one generally V-shaped structure.

The load block 7 is sandwiched between and attached to the main vertical mounts 6 at a position where it will rest against the corresponding mating face on support shank 13 when the blade support assembly 2 is attached to the support shank 13 by means of bolts 8 (see FIGS. 1, 6, and 7). This positioning of the load block 7 allows a close slip fit spacing of the main vertical mounts 6 over the corresponding mating surface of the lower forward tip of the support shank 13 (FIG. 7) and allows the greatest proportion of operating loads to be carried by the load block 7 instead of the attaching bolts 8, creating a push effect between the support shank 13 and the blade support assembly 2 (see FIGS. 1, 6, and 7). The main vertical mounts 6 with the attached load block 7 are attached perpendicular to the back side of the blade backup support 3, centered between its widest section and parallel to the direction of travel. The primary reinforcing plates 4 are attached perpendicular to the outside face of the main vertical mounts 6 and attached to the back side of the blade backup support 3 in a generally horizontal position to the soil in operating position as indicated by soil cut reference line 20 in FIG. 1 (see FIGS. 1, 2, 4, and 5). The primary reinforcing plates 4 also are bent up along a bend line 9 generally parallel to the rear edge of the blade backup support 3, placing the rear portion of the primary reinforcing plate 4 between the holes in the main vertical mounts 6 for the attaching bolts 8, reinforcing the main vertical mounts 6 against side loads to prevent bending or breakage near the area where the support shank 13 mates with the load block 7 (see FIGS. 1, 2, 4, 5, and 6). The secondary reinforcing plates 5 are attached generally perpendicular to the back side of the blade backup support 3 and are also attached to both the top side of the primary reinforcing plates 4 and to the sides of the main vertical mounts 6, providing additional reinforcement against bending or breakage to the blade backup support 3 (see FIGS. 1, 4, and 5).

Both the main vertical mounts 6 and support shank 13 have their lower edges shaped in a fashion allowing increasing clearance proceeding from front to back between their lower edges and the uncut soil beneath the tillage unit as indicated by the ground clearance reference point 24 between the blade support assembly 2 and the soil cut reference line 20 indicated in FIG. 1. This method of manufacture allows for a range of adjustment to improve performance in various soil and operating conditions by changing the angle of the blade support assembly 2 as indicated by adjustment range 19, by means mf adjustment bolt 17, adjustment holes in carrier frame 16, and pivot pin 15 (see FIG. 1). This built-in clearance prevents contact between the uncut soil below and the lower edges of both the support shank 13 and blade support assembly 2 when the tillage unit 1 is operated at a lesser operating angle (see FIG. 1). The blade support assembly 2 has the primary blades 11, the secondary blade 12, and the rip tooth 10 attached to its forward side by means of bolts 14, thus protecting it from the wear and/or breakage associated with soil contacting parts and providing a means for economical and selective replacement, reducing maintenance costs (see FIGS. 1, 2, 3, and 5). In operation the tillage unit 1 is an assembly including the support shank 13, the blade support assembly 2, bolts 8, primary blades 11, secondary blade 12, rip tooth 10, and bolts 14. Attached together to form a single soil-working member attached to a carrier frame 18 (see FIGS. 1, 2, and 3), the relatively thin support shank 13 is mounted to carrier frame 18 in a vertical position by means of pivot pin 15 and adjustment bolt 17 with its greatest surface area parallel to the direction of travel and its narrowest edge perpendicular to the direction of travel. The blade support assembly 2 is attached to the support shank 13 at its lowest forward tip by means of bolts 8 in horizontal position with its longest surface area perpendicular to the direction of travel and its generally V-shaped forward surface inclined downward with the apex portion of the V-shape substantially lower and forward of the opposite elevated rear widest area, forming a sweptback shape (see FIG. 3). The generally V-shaped blade support assembly 2 has the primary blades 11, the secondary blade 12, and the rip tooth 10 attached to it on its forward soil-contacting side by means of bolts 14, providing a protective wear surface and a means for economical and selective replacement. The primary blades 11 and rip tooth 10 overlap the lower forward leading edges of the blade support assembly 2, forming a slightly larger generally v-shaped structure to allow for an amount of wear before replacement becomes necessary (see FIGS. 1, 2, and 5).

As the tillage unit 1 is advanced through the soil below the surface at a given depth, the rip tooth 10 and primary blades 11 will cut and/or tear the soil profile loose within its operating range from the remainder of soil below, vertically lifting and breaking the cut soil profile as it passes rearwardly up over its inclined blade surface before being allowed to drop at or near its original position. The tillage unit has an inclined, sweptback, generally V-shaped blade surface with its longest forward-to-rear soil contacting surface in the center in line with the rip tooth 10 and its shortest forward-to-rear soil contacting surface on the outer edges of the primary blades 11 farthest from the center-mounted rip tooth 10. The blade surface is inclined and swept back with the rear portion of the secondary blade 12 substantially higher than the lower front leading edge of the rip tooth 10 as indicated by the vertical lift distance 23 in FIG. 3. This design allows the soil to be cut in such a fashion so as to give a multi-depth soil cut across a given blade width perpendicular to the direction of travel as indicated in FIG. 3 by point of cut 21 and point of cut 22, relative to the soil cut reference line 20. This multi-depth cutting pattern leaves no plow sole because the depth of cut varies across the tillage unit's operating width, and it eliminates penetration problems associated with large blades in certain soils by concentrating the weight on a smaller area, giving it a wedge effect and creating an amount of operating "suction" to help keep the tillage unit at an operating depth. The multi-depth cutting action and the substantial vertical lifting of the cut soil profile by the inclined blade surface produce a combined soil-loosening action on the soil passing over the blades in a wide variety of soils and soil conditions. The soil is broken up by the cutting action of the rip tooth 10 and the Primary blades 11 and is broken up even further as the deeper and shallower portions of cut soil (indicated by point of cut 21 and point of cut 22 relative to the soil cut reference line 20 in FIG. 3) passing rearwardly and upwardly over the inclined blade surface shear against each other until they meet the flat blade surface. Even further soil loosening is created as the soil reaches its maximum vertical lift distance 23 relative to the soil cut reference line 20 and falls back near its original position, breaking the soil as it bends while passing over the highest rearward edge of the secondary blade 12. The degree of operating suction as well as the soil-loosening action of the tillage unit can be varied to suit various soils and soil operating conditions by changing the degree of incline of the blade surface, which also changes the vertical lift distance 23 relative to the soil cut reference line 20. In this case the blade angle can be changed as indicated by the adjustment range 19, by repositioning the support shank 13 to one of the multiple adjustment holes in the carrier frame 16 by rotating on pivot pin 15, then locked into the desired position with adjustment bolt 17 (see FIG. 1).

Since the row unit 1 operates primarily below the soil surface, there is minimal soil surface and soil surface crop residue disturbance of the tilled soil. The soil profile is merely cut, lifted, and dropped back at or near its original position in a condition of good soil tilth. The relatively thin support shank 13 is the only part protruding through the cut soil profile, leaving a relatively narrow slot of worked soil where it slits the soil profile passing over its blade surface. The tillage unit 1 can be mounted singly or in multiples that match the draft requirements with the power unit pulling it. When mounted on a common frame in multiple configurations the tillage unit 1 can be positioned so that the outer wing tips of the primary blades 11 are spaced far enough apart to allow for passage of material caught by the primary blades 11 or rip tooth 10 but still be close enough to allow the soil between the blades to be broken loose by a tearing and/or shattering action, in effect working the entire soil profile within the machine's operating width. The desired spacing between tillage units mounted in multiple configuration will vary depending on differences in the soil worked and the soil crop residue.

The foregoing is considered as illustrative only of the principles of the invention. Further, since numerous modifications and changes will readily occur to those skilled in the art, it is not intended to limit the invention to the exact construction shown and described, and accordingly all suitable modifications and equivalents may be resorted to, falling within the scope of the invention.

What is claimed as new is as follows:

1. A tillage unit designed to perform a tillage operation with minimum soil surface and soil surface crop residue disturbance, comprising:
   a) a vertical support member with generally narrow front and rear margins relative to the side margins, said member including a lower front margin shaped to correspond to a mating blade assembly and a lower bottom margin of said support member inclined upwardly from front to rear providing an operating clearance between the bottom side of said vertical support member and the uncut soil remaining below;
   b) said blade assembly including pieces attached together to form a generally inclined V-shaped structure connected to the lower front margin of said vertical support member and having a bottom surface shaped and disposed in a position providing an operating clearance between the bottom side of said blade assembly and said uncut soil remaining below which increases from front to rear;
   c) and said blade assembly further including a pair of vertical plates extending from a rear surface of the V-shaped structure and a plurality of generally horizontal plates attached to the outer sides of said vertical plates, the rear portions of said horizontal plates extending rearward past the front lower margin of said vertical support member and being bent upward along a line generally parallel to the rear upper margins of said blade assembly.

2. The tillage unit of claim 1 wherein said blade assembly includes a generally V-shaped face plate having said vertical plates attached to the rear side, a means for attaching said blade assembly to the lower front margin of said vertical support member, with a piece attached between said vertical plates disposed at a position corresponding to the front lower margin of said vertical support member, whereby a pushing force is transferred from said vertical support member to said blade assembly.

3. The tillage unit of claim 1, further comprising a means to adjust the forward to rearward inclination of the blade assembly.

* * * * *